Patented July 28, 1936

2,048,833

UNITED STATES PATENT OFFICE 2,048,833

METHOD OF MANUFACTURING DULLED ARTIFICIAL PRODUCTS OF VISCOSE

Kurt Witte and Hans Cayser, Rorschach, Switzerland, assignors to the firm Feldmühle A. G. vormals Loeb, Schoenfeld & Co. Rorschach, Rorschach, Switzerland No Drawing. Application May 31, 1934, Serial No. 728,425. In Germany June 6, 1933

4 Claims. (Cl. 106—40)

This invention relates to methods of manufacturing dulled or matted products of viscose.

It is known to make dulled or matted products of viscose having a maximum tinging capacity in such a manner that the viscose is mixed with inorganic pigments which, when the viscose is precipitated, remain in the product unchanged and thus impart to the thread or film the desired lucid glassy aspect and render it dull and opaque.

As, for making any kind of products, the viscose must be extruded through extremely minute apertures, it is required to apply the pigments in such a fine state and to divide them throughout the mass of the viscose in such a fine distribution that the minute apertures are not clogged during the spinning process. Though it is possible to grind pigments in dry condition to a nearly colloidal state which satisfies the requirements in regard to degree of fineness to be obtained, these fine particles, for example of titanium dioxide, which compound is preferably applied for dulling purposes due to its high tinging capacity, stick to each other so to speak in the form of viscous conglomerates so fast that distributing the compound through the viscid viscose is extremely difficult and spinning a viscose having dry titanium dioxide admixed thereto by stirring or kneading is altogether impossible.

For this reason, it has already been proposed to pass the viscose prior to the spinning process through filter presses which are lagged with densely woven fabrics with a view to attaining the required degree of distribution by the filtering operation. But also these methods failed to bring about the desired result as the presses become clogged and thus a portion of the titanium dioxide is kept back, so that the viscose, which passes through the filter press first, contains, depending on the degree of permeability of the press, a higher percentage amount of titanium dioxide than the viscose passing through later. This results in non-uniformities even if the viscose be subsequently homogenized once more, as every individual charge of a number of consecutive charges differs from the others and consequently a great variety of different degrees of dulling of the spun threads ensues, due to the extraordinary efficiency of the titanium dioxide, even with but slight differences in the specific content of this substance. Aside from this, a continued production is impossible also due to the presses becoming clogged after a short time, the operation thus being frequently interrupted.

In an endeavour to avoid this deficiency, it has already been proposed to admix to the viscose in addition to titanium dioxide other substances, such as for example petroleum, with a view to facilitating the filtration. At the same time attempts were made to obtain a higher degree of dulling by means of this addition.

The filtering process is, however, not obviated by this measure and thus this method is unreliable in the same way as the previously mentioned one. Similar difficulties are encountered as in the method wherein no additional ingredients are used, as also here the presses are quickly obstructed. Therefore it is necessary to homogenize the mass once more after the filtering, in order to obtain a uniform dulling effect throughout, but even then the disadvantage ensues that the various charges are of different dulling effects.

Though by adding petroleum to viscose it is feasible to obtain a dulling effect, the presence of titanium dioxide prevents this effect from showing up, so that the said addition is useless in this respect.

Thus it will be seen that by means of this known method it is impossible to obtain either continuity of production nor special effects of dulling. Moreover, the relatively high percentage amount of petroleum is detrimental to the strength of the spun viscose threads.

Again, it has also been proposed to mix the titanium dioxide with liquids prior to adding it to the viscose with a view to facilitating the homogenizing of the viscose mixture.

As liquids for this purpose, for example, on the one hand water or solving agents respectively, for the mass to be spun have been recommended and on the other hand oils, such as linseed oil, olive oil and the like. With the aid of these means it is intended to homogenize the pigment in a ball mill. Experience has now shown that by the addition of water merely a suspension ensues and thus the formation of a homogeneous mass is prevented. With the aid of oils, as linseed and olive oils, a sufficiently homogeneous mixture is obtained only if considerable amounts of oil are admixed. Additions of Turkey red oil which is recommended as a dispersing agent have no improving effect.

Water and other liquids dissolving the viscose are advantageous for use as carriers for the pigment in so far as these liquids separate from the thread during the spinning process and thus do not cause dulling of the viscose and should be expected to assist in furnishing a thread which is stronger than one containing in addition to the pigment, for example titanium dioxide, still other foreign substances. It is, however, a surprising fact that, when such substances are used, the spinning process does not always take a satisfactory course even in the event of the titanium dioxide having apparently been uniformly admixed, and the strength of the spun threads does not always come up to expectations, while the yield is too small. All of this is due to the considerable difficulty to be met in endeavouring to obtain the requisite degree of uniformity of distribution of the individual particles.

Relatively large quantities of the said oils are necessary for mixing the titanium dioxide properly therewith, but this has the drawback that the strength of a thread spun from viscose with additions of this kind is impaired due to the presence of the high percentage amount of foreign substances. By the application of titanium dioxide alone the fibres are weakened, and due to the presence of oil as a subsidiary means the strength of the material is further decreased, so that the quality of the silk is naturally lessened. Moreover, this method has the disadvantage inherent thereto that the oils are liable to change texture due to their saponifiability and thus the quality of the silk, containing such oils gradually decreases when the silk is stored.

It is, however, impossible to use for this method substances such as for example liquid paraffine, petroleum, benzine, pinene, benzene, tetraline, decaline or the like which substances as such have no detrimental effect on the finished product, as these substances were required to be added in such large percentage amounts that a thread of an entirely inferior quality would ensue. Also the addition of Turkey red oil would not help for changing these percentage amounts.

Thus, of these substances a weight almost three times as large as that of the equivalent amount of titanium dioxide were required in order to obtain a paste which is of a sufficient liquidity to permit of being emulsified with viscose, which disqualifies this method as a successful one from the start. In most cases, namely, it is impossible also by these means to produce homogeneous masses.

It was now found as a surprising fact that just the substances mentioned above, which mix with titaniumdioxide only with difficulty and in considerably less satisfactory proportions than the fatty oils, can be easily worked into liquid pastes together with titaniumdioxide and, provided that the same conditions prevail, with less difficulty than these oils, when to these substances a slight amount of sulphonated mineral oil is added. In this manner, with the simplest means and in a short time, an absolutely homogeneous mass is obtained which is very easily emulsified with viscose. The distribution thus obtained is so fine that any sort of filtration for improving the homogeneity, as prescribed by most of the methods is dispensed with. These conditions are so much more surprising as the same method when applied to fatty oils fails to produce the same effect.

In mixing titaniumdioxide with different substances in the proportion of 1:1 the following effects are obtained:

| Without addition of sulphonated mineral oil | | With 20% of sulphonated mineral oil added |
|---|---|---|
| Linseed oil | Semi-solid mass | Scarcely liquid mass. |
| Olive oil | do | Do. |
| Peanut oil | do | Do. |
| Castor oil | do | Do. |
| Oleine | Semi-liquid mass | Semi-liquid mass. |
| Fluid paraffine | Solid, dry mass | Very liquid mass. |
| Benzine | do | Do. |
| Petroleum | do | Do. |
| Benzene | do | Do. |
| Pinene | do | Do. |
| Decaline | do | Do. |

From this tabulation it follows that just the oils that were hitherto recommended for producing pigment pastes for the manufacture of matted silk have no peculiar effects when sulphonated mineral oil is admixed, but that the substances which can not be used alone and which had so far not been used at all behave beyond expectation in an entirely contrary manner.

The sulphonated mineral oil admixed to these substances effects upon stirring readily and quickly a perfect dispersion with the pigment so that a smooth mass is obtained. If the stirring is continued for a length of time insufficient for effecting a dispersion but sufficient for mixing the particles coarsely, a final dispersing process sets in even in merely letting stand the mass. Thus, the coarsely mixed mass becomes smooth simply by allowing the mass to stand, whereas when fatty oils are used the degree of dispersion remains unchanged by merely allowing the mass to stand, even if sulphonated mineral oil be admixed. The high fluidity and smoothness of the mass is due to the fact that conglomerates of particles are no longer present but that the whole mass consists of a uniform distribution of individual particles.

Owing to the dispersiveness of the sulphonated mineral oil and in spite of the small quantity of oil present every minute particle of titaniumdioxide is separately enveloped in a covering film of oil and only after the formation of these films, whereby the oil acts as a support, it is possible to admix the titaniumdioxide to the viscose in a perfectly uniform manner.

When this mass to which the sulphonated mineral oil is admixed is added to the viscose, the mass on stirring divides through the viscose rapidly to give it a smooth appearance contrary to a mass which is prepared from other oils with sulphonated mineral oil admixed therewith, in which case the viscose assumes a more or less granular aspect which disappears only after considerable stirring combined with filtering, but which may nevertheless cause sedimentation during the time required for the viscose to stand for the air to escape therefrom and during the spinning process. In contradistinction thereto, any viscose emulsified with the substances previously referred to by way of example, after sulphonated mineral oil was added to these substances, presents even after only a brief mixing operation and without filtration a uniform texture free of deposits so that it can be spun without any further provisions.

Due to the extraordinary dispersiveness of the sulphonated mineral oil, the presence of this oil permits shortening of the time of stirring in applying the method. Furthermore, there is no necessity for filtering following the stirring and less material is required, as the tinging surface increases proportionately to the degree of dispersion. Brittle portions as arising in the thread when other methods are applied and which are caused by incomplete breaking up of conglomerates into individual particles do not occur.

The method according to this invention has the enormous advantage inherent thereto that by means of it in any viscose any desired percentage amount of titaniumdioxide can be incorporated without difficulty in homogeneous manner. At the same time such a small amount of the auxiliary substance is required that no detrimental effect on the quality of the thread spun from a viscose of this kind can ensue. The quantity of auxiliary substance used in this method is so small that this substance alone would hardly cause dulling of the artificial silk thread. Any surplus amount of foreign substances, which when applied to titanium directly were of but a slight effect, is avoided and consequently the percentage amount of titanium to be added can be increased to have its full effect.

Therefore, by applying the method according to the invention not only safety of operation in manufacturing dulled titanium silk is warranted, but also the production of threads presenting an aspect from a dull silvery lustre to a lustre specifically characteristic for cotton without, however, being accompanied by the slightest surface sheen due to the relatively large amount of titaniumdioxide which can be incorporated in the viscose without difficulty. Furthermore, the manufacture of a product of a high quality is ensured which is of normal strength and the degree of dulling of which can be maintained constant uniformly throughout. Moreover, the auxiliary substances entering into question are cheap and the quantities necessitated small. Waste losses of material which unavoidably arise in filtering are avoided.

Example 1

120 grams of titaniumdioxide are mixed with 50 grams of liquid paraffine to which 10 grams of sulphonated mineral oil were added, and mixed intimately. The paste obtained is emulsified with 100 kilograms of viscose of a requisite degree of maturation and homogenized. After the air has been caused to escape the viscose is spun in usual manner.

A slightly dulled thread results.

Example 2

120 grams of titanium dioxide are intimately mixed together with 50 grams of fluid paraffine to which 10 grams of sulphonated mineral oil were added, and mixed intimately. The paste obtained is emulsified with 40 kilograms of viscose of the requisite degree of maturation and homogenized. After the air has been caused to escape the viscose is spun in usual manner.

A highly dulled thread results.

In a similar manner viscose emulsions as described can be worked into films.

We do not limit ourselves to the particular size, shape, number or arrangement of parts as shown and described, all of which may be varied without going beyond the scope of our invention as shown, described and claimed.

What we claim is:

1. In a process for the production of low luster artificial compositions from viscose in which titanium dioxide is used as a delustering agent, the steps comprising intimately admixing $TiO_2$ with a substance selected from the group consisting of liquid paraffine, benzene, pinene, tetraline, and decaline, in the presence of a sulfonated mineral oil and thereafter emulsifying and homogenizing the mixture with viscose.

2. Process for the production of low luster artificial compositions from viscose in which $TiO_2$ is used as a delustering agent, the steps comprising intimately admixing the $TiO_2$ with a liquid paraffine in the presence of sulfonated mineral oil, and thereafter emulsifying and homogenizing the mixture so produced with viscose.

3. Process for the production of low luster artificial compositions from viscose in which $TiO_2$ is used as a delustering agent, the steps comprising intimately admixing the $TiO_2$ with a benzol in the presence of the sulfonated mineral oil, and thereafter emulsifying and homogenizing the mixture so produced with viscose.

4. Process for the production of low luster artificial compositions from viscose in which $TiO_2$ is used as a delustering agent, the steps comprising intimately admixing the $TiO_2$ with a pinene in the presence of sulfonated mineral oil, and thereafter emulsifying and homogenizing the mixture so produced with viscose.

KURT WITTE.
HANS CAYSER.